Aug. 1, 1933.                R. HENRY                1,920,558
OIL LESS SPRING SHACKLE
Filed July 17, 1925
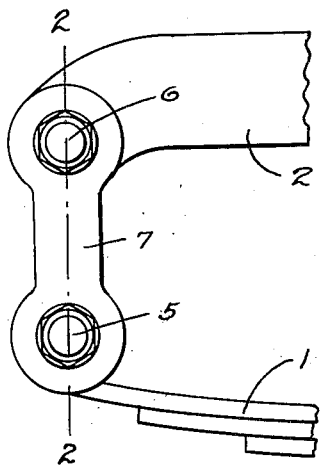
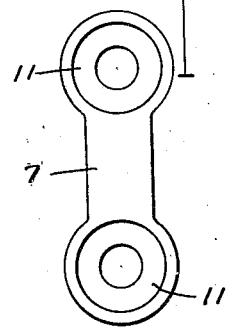
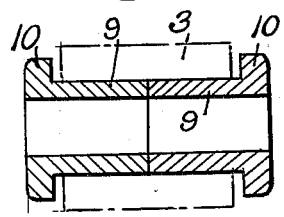
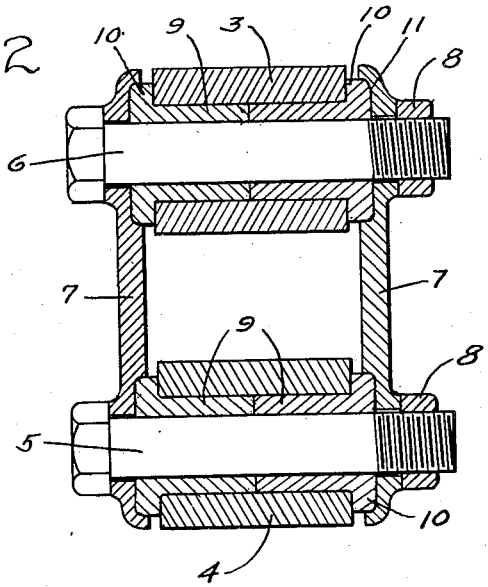
INVENTOR
Raymond Henry.
BY Walter N. Haskell
his ATTORNEY Patented Aug. 1, 1933

1,920,558

UNITED STATES PATENT OFFICE 1,920,558

OIL-LESS SPRING SHACKLE

Raymond Henry, Rock Island, Ill., assignor, by mesne assignments, to Henry Manufacturing Co., Davenport, Iowa, a Corporation of Iowa Application July 17, 1925. Serial No. 44,231

5 Claims. (Cl. 267—54)

My invention has reference to oil-less spring shackles, such as are employed in automobiles and other vehicles for connecting the end of the spring to the frame, in such manner as to permit a limited amount of freedom of movement of the parts with relation to each other. In a common construction of such connections the end of the spring is united with the frame or other part by means of connecting members, usually in the form of links, provided at their ends with pins or bolts which pass through bearings in the ends of the spring and frame. On account of the wear between the metallic parts of which the joint is formed it is found necessary to provide a means for lubricating such parts, and this has been accomplished by using a special form of bolt having an oil duct extending through the same. On account of the exposed positions of the joints they soon become covered with dust and dirt, which mixes with the oil, forming a gummy, lapping material, which hastens the wearing of the parts. This wear also results in an unpleasant rattling sound.

The chief purpose of the present invention is to provide a joint for spring shackles and a variety of other uses, in which there will be no metal surfaces having a wearing contact with each other, and in which no lubrication will be required. This makes it possible to use a bolt of standard construction, with a consequent saving in the production cost.

Another purpose of the invention is to do away with the rattling sound, and with the difficulty of keeping the parts well oiled, which accompanies the use of the present devices. The shackles of well-known construction usually have one joint located just above the other, and even when provided with lubricating means, the tendency of the oil, especially in the upper bearing, is to work downwardly, leaving the bearing dry, and requiring frequent lubrication in order to operate satisfactorily, and do away with wear. By doing away with the necessity for lubrication, the danger of collection of dirt and formation of substances increasing the wear on the joints is also eliminated.

The above-named, and other features and advantages of the invention will more fully appear from the following specification, reference being had to the accompanying drawing, in which;

Fig. 1 is a fragmentary view, showing the end of a spring and connections thereof.

Fig. 2 is a vertical section, on the broken line 2—2 of Fig. 1.

Fig. 3 is a detail of one of the links 7, showing the inner face thereof.

Figure 4 is a view illustrating that the bearing-fitting portions of the two bushings are initially longer than the space to be occupied thereby within the bearing.

Referring now to the embodiment of my invention shown in the drawing, 1 indicates the end of a leaf spring of ordinary construction, and 2 a part of the frame connected therewith, the ends of said parts being provided with tubular bearings 3 and 4, through which pass bolts 5 and 6, connected at their ends by connecting members such as links 7, said bolts being held in place by nuts 8 on the threaded ends thereof. Between each bolt 5, 6 and the inner surface of the bearing through which it extends, is an elastic bushing 9 best made of semi-hard rubber or similar resilient material possessing great wear resisting qualities. In the construction shown said bushings are each composed of two similar parts each comprising an elastic tubular member adapted to fit closely upon the bolt between it and the inner surface of the bearing, and a head or flange 10 at one end of said tubular member that is adapted to abut against one end of the bearing when it is placed therein. The two parts of the bushing may thus be inserted in the bearing from its opposite ends, and when in place they together form a spool-like bushing that fills the space between the bolt and the inner surface of the bearing and projects outward beyond its ends to an extent corresponding with the thickness of the heads above-mentioned. As shown in Figure 4, the tubular members of the parts of each bushing are best made long enough so that their combined length is somewhat greater than that of the bearing in which they are seated, by which arrangement by drawing the parts of the bushing together while in the bearing they may be compressed endwise and thereby caused to expand radially so that they will be forced into tight contact with the outer face of the bolt and the inner surface of the bearing, as will be further explained hereinafter.

As best shown in Fig. 2, the connecting members 7 are provided on their inner faces opposite the heads 10 with recesses or pockets 11 which engage said heads 10 peripherally and fit closely enough upon them to prevent them from spreading radially under compression, with the result that when a nut 8 is tightened on its bolt the compressing force applied to the heads 10 by the drawing of the connecting members together is transmitted inwardly and longitudinally of the bushing. Consequently the bushing members are forced toward each other and their tubular portions are expanded into tight engagement with the surfaces of the bolt and the bearing with which they are in contact. At the same time the heads 10 are pressed tightly against the ends of the bearing. This radial expansion of the tubular portion of the bushing causes its outer face to practically adhere to the bearing and its inner face to practically adhere to the bolt, so that no material movement or rubbing action occurs between the contacting surfaces. In case of rotary movement of the bolt relatively to the bearing the elasticity of the material of which the bushing is composed permits the body portion thereof to respond to the action of said parts with a torsional action in one direction or the other, as distinguished from a turning of the bushing upon the outer surface of the bolt or upon the inner surface of the bearing. This eliminates the possibility of any rubbing action between said parts and the bushing, which might result in wear or objectionable noise.

It should be understood that while the best and simplest way to obtain the desired radial expansion of the tubular portion of the bushing is to make it of two members which together are long enough to contact with each other as previously explained, my invention broadly considered is not limited to such arrangement, but includes any other equivalent means by which endwise compression of the bushing member or members is made effective to cause them to expand radially.

In the construction hereinbefore set forth a flexible connection is provided between the parts 1 and 2, permitting a limited movement of one of said parts longitudinally of the other. The bushings 9 not only furnish frictionless bearings between the bolts 6 and parts 3 in which they are positioned, so that no lubrication is required, but they are also noiseless. The flanges 10 are positioned at points where there is ordinarily considerable looseness of the parts, especially after there has been some wear thereon, which looseness is attended by the unpleasant rattling sound before mentioned. Any such looseness or rattling between the ends of the bearings and the connecting links is thereby overcome.

The bushings are formed in two parts in order that they may be readily placed in position in the bearing, and also for convenience in manufacturing same. It will be evident that if the same were to be made in one piece of spool formation, the enlarged ends would interfere with placing the same in position for use.

One way of assembling the parts of the shackle is to first place the bushing sections in position in the bearing, and then connect the links at the ends thereof by passing the bolt through the openings in the ends of the links and in the bushing, and securing the same in place. The bore of the bushing is of a sufficient size to permit of the bolt passing easily through the same, but upon the parts being drawn tightly together the bushing material is crowded into the space between the bolt and bearing, as hereinbefore mentioned.

In case of any excessive wear on the bushing it can be easily removed and replaced by another, and the device can be readily applied to shackles already in use, by removing the old connecting parts, with the metal bushing usually employed in such devices, placing the bushing 9 in position, and substituting the links 7 for the connecting parts which have been removed. If desired the old bolts can be returned to their positions. In case of the shackle being manufactured complete the simple form of bolt would be used.

For the purposes of illustration the device has been shown and set forth herein in a double formation, but it will be obvious that the same can be readily applied to a single form of joint, to a wrist-pin bearing, or other point where one of the parts has a limited rocking action with relation to the other. Changes can also be made in the form and arrangement of the parts and in the particular elastic or resilient material from which the bushing is formed, without departing from the spirit of the invention, as set forth and claimed herein.

What I claim, and desire to secure by Letters Patent, is:

1. A connection of the type described, comprising a member having a cylindrical bearing, a bolt extending through said bearing, laterally spaced side arm members supported on the end portions of the bolt, a bushing interposed between the bolt, the bearing and said side arm members, consisting of two elastic tubular members extending into the opposite end portions of said bearing and abutting against each other, each of said elastic tubular members having a head at its outer end adapted to abut against the adjacent end of the bearing, annular recesses formed directly in the inner faces of said side arm members and fitting over and engaging the outer surfaces of said heads to confine the same and resist outward expansion thereof, and means coacting with said bolt and with said side arm members for compressing said tubular members, said side arm members being oscillatable relatively to said bolt.

2. A connection of the type described, comprising two spaced members, each having a cylindrical bearing, a cylindrical bolt extending through each of said bearings, laterally spaced side links extending between said bearings and supported on the end portions of the two bolts, a two-part bushing in each of said bearings composed of elastic tubular members fitted in the opposite end portions of each bearing and each having a substantially cylindrical head at its outer end adapted to abut against the adjacent end of its respective bearing, each of said side links having substantially cylindrical recesses formed in their inner faces at opposite ends thereof for engaging over said substantially cylindrical heads, and means coacting with said bolts and with said side links to compress said tubular members, said side links being oscillatable relatively to said bolts.

3. A connection of the type described, comprising a member having a cylindrical bearing, a bolt extending through said bearing, connecting members supported on the end portions of said bolts, and a bushing interposed between the bolt, the bearing and said connecting members, consisting of two elastic tubular members each comprising a sleeve portion and a head on the outer end thereof, said sleeve portions extending into the opposite ends of said bearing and having their inner ends in abutment, the total length of the two sleeve portions of both tubular members exceeding the length of said bearing when initially inserted into said bearing, and means coacting with said bolt and with said connecting members to compress said tubular members to reduce the total length of said two sleeve portions to the length of said bearing and to press the inner faces of said heads into engagement with the ends of said bearing.

4. A connection of the type described, comprising a member having a substantially cylindrical bearing, a bolt extending through said bearing, connecting members supported on the end portions of said bolt, and a bushing interposed between the bolt, the bearing and said connecting members, comprising two elastic tubular members each including a bearing-fitting portion of a diameter sized to fit within said bearing, said bearing-fitting portions being of sufficient length so that when both are initially inserted into said bearing they exceed the length of the space which can be occupied thereby within said bearing, and means coacting with said bolt and with said connecting members for compressing said tubular members axially.

5. A connection of the type described, comprising a member having a substantially cylindrical bearing, a bolt extending through said bearing, connecting members supported on the end portions of said bolt, and an elastic tubular bushing interposed between the bolt, the bearing and said connecting members, said bushing comprising a bearing-fitting portion of a diameter sized to fit within said bearing, said bearing-fitting portion being of sufficient length so that when initially inserted into said bearing it exceeds the length of the space which can be occupied thereby within said bearing, and means coacting with said bolt and with said connecting members for compressing said elastic bushing axially.

RAYMOND HENRY.